United States Patent [19]

Kushibe et al.

[11] Patent Number: 4,660,753

[45] Date of Patent: Apr. 28, 1987

[54] AUTOMATIC WELDING APPARATUS

[76] Inventors: Norishige Kushibe; Kaoru Shinozuka, both of c/o Takase Factory of Kabushiki Kaisha Kushibe Tekkosho, 1574-1, Oaza Kamitakase, Takase-cho, Mitoyo-gun, Kagawa, Japan

[21] Appl. No.: 837,193

[22] Filed: Mar. 10, 1986

Related U.S. Application Data

[63] Continuation of Ser. No. 555,578, Nov. 28, 1983, abandoned.

[30] Foreign Application Priority Data

Nov. 29, 1982 [JP] Japan ................... 57-209750

[51] Int. Cl.⁴ ........................................... B23K 37/04
[52] U.S. Cl. ......................................... 228/48; 228/7; 228/25; 219/125.11
[58] Field of Search ................. 228/7, 8, 25, 26, 28, 228/29, 30, 48; 219/60 R, 60 A, 60.2, 61, 61.3, 124.4, 125.11

[56] References Cited

U.S. PATENT DOCUMENTS 3,439,856  4/1969  Phillips .
4,014,495  3/1977  Oda .
4,471,201  9/1984  Hardy ..................... 219/125.11

FOREIGN PATENT DOCUMENTS

U1801497  12/1958  Fed. Rep. of Germany .
B2020616  12/1973  Fed. Rep. of Germany .
A2628734   6/1976  Fed. Rep. of Germany .
A2456588   5/1929  France .

OTHER PUBLICATIONS

Patent Abstracts of Japan, vol., 3, No. 46, Apr. 18, 1979 & JP-A-54-20934.
Welding Equipment Dept.; Matsushita Electric Industry Co., Ltd.; Osaka, Japan, Oct. 1, 1982.

Primary Examiner—Nicholas P. Godici
Assistant Examiner—K. Rowan
Attorney, Agent, or Firm—Birch, Stewart, Kolasch & Birch

[57] ABSTRACT

An automatic welding apparatus for forming a circular bead along a circumference of a first workpiece at its junction with a second workpiece in order to weld the former to the latter, comprising a turntable, clamp members for clamping the second workpiece to the turntable, a torch holder for holding a welding torch in an adjusted position, a torch positioner which is engageable with the first workpiece, for maintaining a constant relative positional relationship between the welding torch and the first workpiece, a positioner guide mechanism for supporting and guiding the torch positioner to a desired position in a plane extending in parallel relationship with respect to a surface plane of the turntable, and the torch holder being restricted from rotating.

10 Claims, 8 Drawing Figures

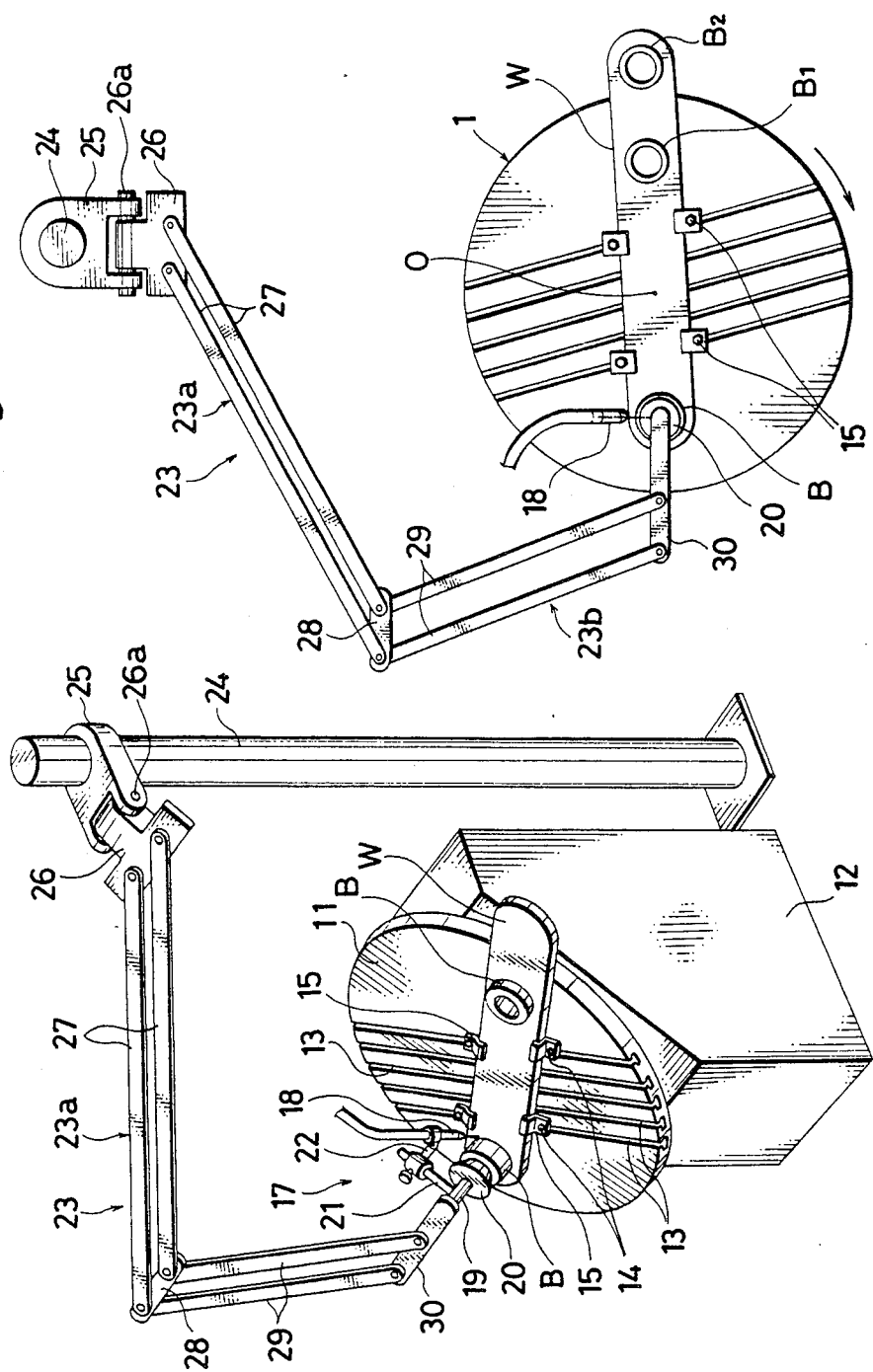

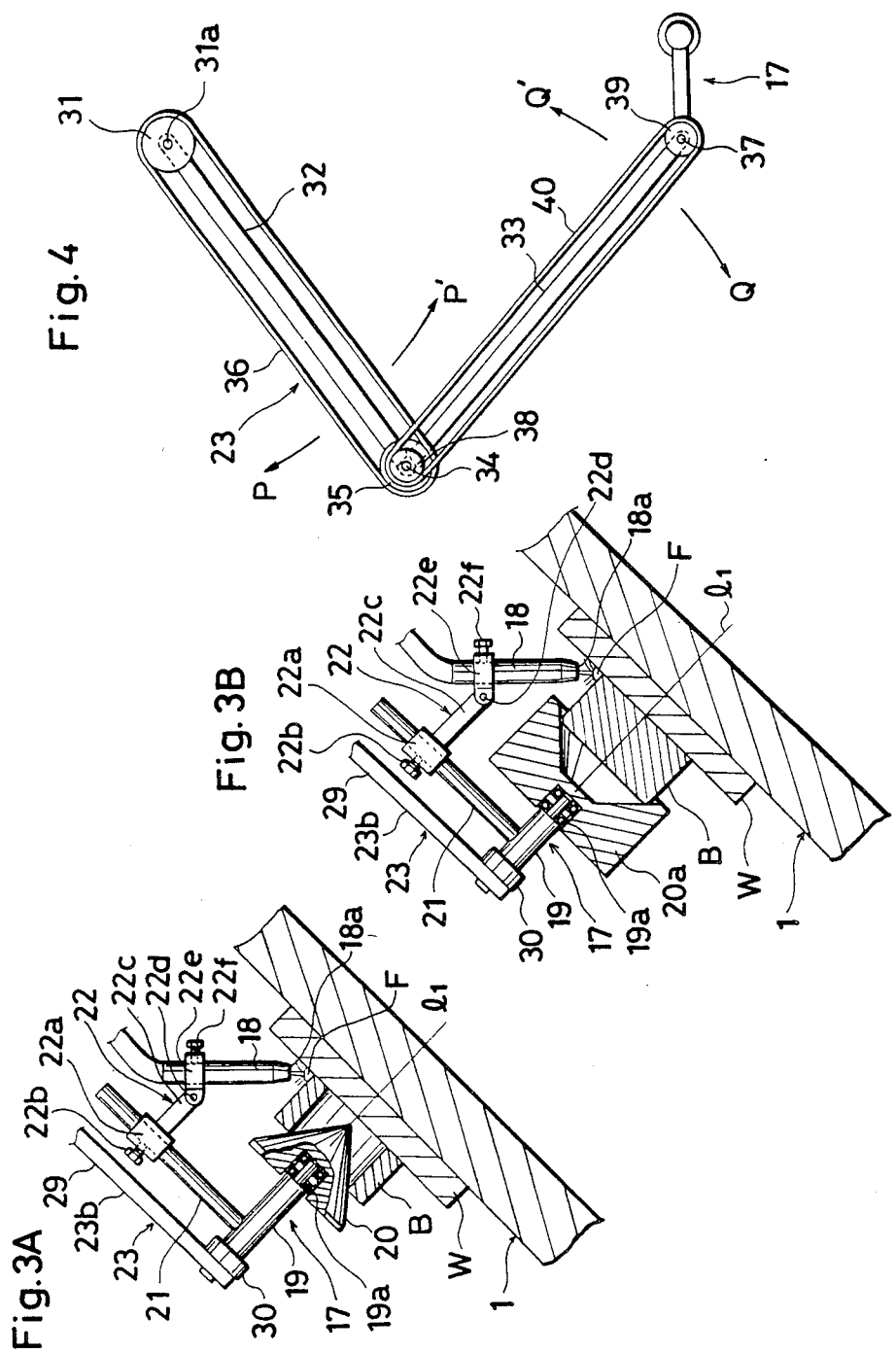

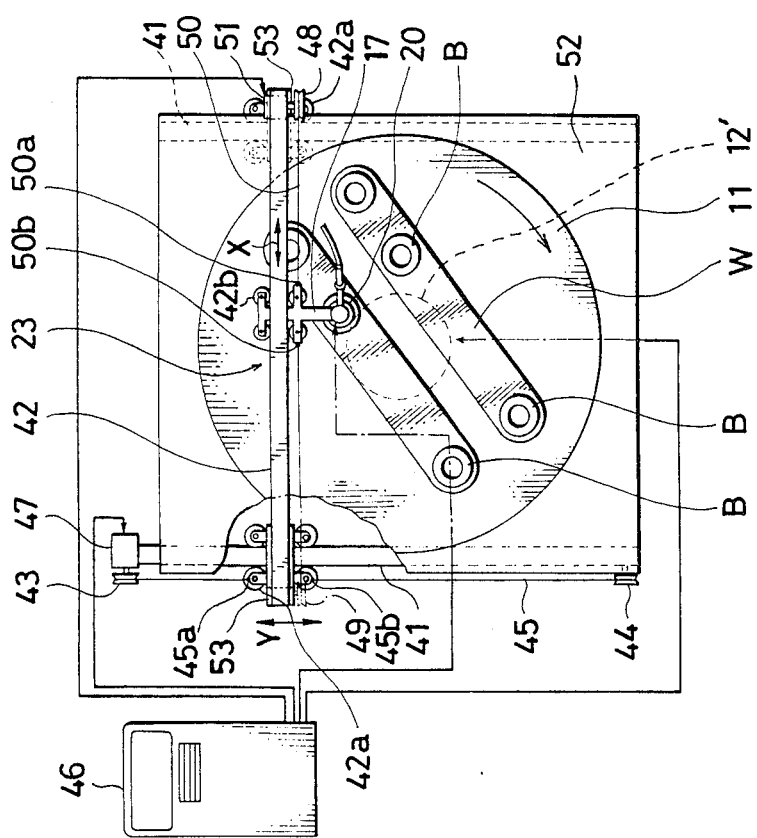
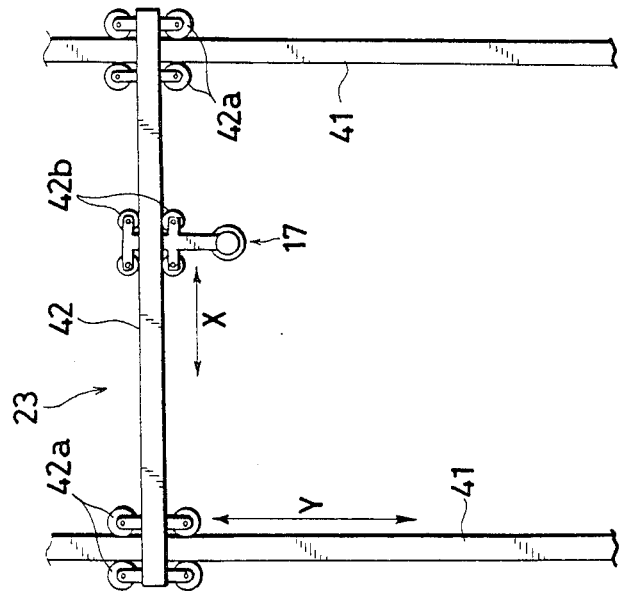

AUTOMATIC WELDING APPARATUS

This application is a continuation of copending application Ser. No. 555,578, filed on Nov. 28, 1983, now abandoned.

BACKGROUND AND SUMMARY OF THE INVENTION

This invention relates to an automatic welding apparatus, and more particularly to improvements in a stationary torch type automatic fillet-welding apparatus for forming a circular bead along the circumference of a tubular or cylindrical first workpiece at its junction with respect to a substantially flat second workpiece in order to weld the former to the latter.

The automatic fillet-welding apparatus for forming a circular bead is utilized, for example, in the manufacture of construction machines such as a power shovel, in order to weld a tubular member such as a boss (first workpiece) to a substantially flat-shaped arm or a plate (second workpiece).

The conventional automatic fillet-welding apparatus for forming a circular bead may be roughly classified into two types, that is, a stationary torch type and a movable torch type.

A typical model of the stationary torch type is disclosed, for example, in a catalog as of Oct. 1, 1982 published by Welding Equipment Department of Matsushita Electric Industrial Co., Ltd., Osaka, Japan. More particularly, on Page 2 of the catalog, there is disclosed a typical stationary torch type automatic circular arc welding apparatus named "PANATURN S" (Model YJ-1013E-3). Another typical model of the stationary torch type is also disclosed in U.S. Pat. No. 4,014,495 to Oda et al. The stationary type circular fillet-welding apparatus is generally provided with a fixed welding torch and a turntable on which a second workpiece, having a first workpiece provisionally fixed thereto, is clamped in position, wherein a desired circular fillet-welding is performed during one rotation of the turntable.

A typical model of the movable torch type is disclosed, for example, in U.S. Pat. No. 3,439,856 to E. J. Philipps et al, wherein a welding torch is arranged so as to move round a tubular first workpiece fixed in position.

The movable torch type apparatus generally has such disadvantages that a welding cable connected to a welding torch is occasionally twisted during turning movement of the torch and that troublesome or time-consuming preparation is required for accurately adjusting a turning radius of the torch in accordance with a radius of a tubular first workpiece to be welded to a flat second workpiece. However, such disadvantages of the movable torch type are not observed in the stationary torch type apparatus. However, the conventional stationary torch type apparatus has its own disadvantages.

Since the present invention is directed to improvements in the stationary torch type automatic fillet-welding apparatus for forming a circular bead, detailed description will now be made hereinafter in connection with FIG. 7 of the accompanying drawings in order to clarify the general structure of the same type of the conventional apparatus and the inherent disadvantages invited by the particular structure thereof.

In FIG. 7, there is illustrated a typical example of the conventional stationary torch type automatic circular fillet-welding apparatus as having a turntable 1 inclined at an angle of 45° with respect to a horizontal plane and rotatably supported by a machine frame 2 in which a known drive mechanism is housed. The turntable has a plurality of known spaced T-slots formed in its outer surface wall, so that clamp members 3 can be engaged with the slots with the aid of known T-slot bolts and nuts, conventionally.

In preparation, a tubular first workpiece 7 is provisionally fixed in position to a flat second workpiece 4 for example by tack-welding. The second workpiece 4 is fixed in position to the turntable 1 by means of the clamp members 3 which are engaged with the T-slot bolts and nuts as illustrated. It is to be noted that the first tubular workpiece 7 on the second workpiece 4 should be positionally adjusted so that its center is accurately coincident with the center of the turntable 1.

A welding torch 5 supported by a supporter 6 is adjustably positioned so that its working end is exactly directed to the junction of the first and the second workpieces 7 and 4. Thus, as the turntable 1 rotates about its center, a desired circular fillet-welding is carried out by the fixed welding torch 5 to weld the first tubular workpiece 7 to the second flat workpiece 4 at the circular junction of the workpieces 7 and 4. In this connection, it will be easily understood that, because the turntable 1 is inclined at an angle of 45° with respect to a horizontal plane, a formed weld bead is equally distributed to both sides of the workpieces 4 and 7.

Because of the above described particular structure of the conventional stationary torch type apparatus, the center of the first tubular workpiece 7, provisionally fixed to the flat second workpiece 4, should be exactly coincident with the center of the turntable 1, resulting in that troublesome and time-consuming preparation is inevitably required for adjusting the center of the first workpiece 7 to the center of the turntable 1. More particularly, because a part of the second workpiece 4 is inevitably placed over the center of the turntable 1, this center is inevitably hidden by the second workpiece 4, resulting in that an operator cannot find an accurate location of the center of the turntable 1 with his eyes and thus it is necessary to rely upon troublesome measurements to find the location. This preparation is especially troublesome and time-consuming in the case where the workpieces 4, and 7 are large in size.

Further, in the case where it is necessary to weld two or more tubular first workpieces 7 to a flat second workpiece 4, as illustrated in FIG. 7, the second workpiece 4 must be moved each time after one circular welding operation is over, which is very inefficient. Furthermore, in the case where a first workpiece 7 is welded to one extremity of a considerably long-sized second workpiece 4, a turning radius of the workpiece 4 becomes so large that the overhanging portion (portion which radially extends beyond the circumference of the turntable) of the workpiece 4 may collide with the ground or any other thing lying in the vicinity during operation, which is very dangerous.

It is, therefore, an object of the invention to substantially reduce the above-discussed disadvantages in the conventional stationary torch type automatic circular fillet-welding apparatus.

Another object of the invention is to provide an improved stationary torch type automatic circular fillet-welding apparatus in which it is no longer necessary to positionally adjust the center of a tubular or cylindrical first workpiece, provisionally fixed to a flat second workpiece, to the center of a turntable.

A further object of the invention is to provide an improved stationary torch type automatic circular fillet-welding apparatus which permits welding of a plurality of tubular or cylindrical first workpieces to a substantially flat-shaped second workpiece one after another without moving the second workpiece which has been fixedly clamped to the turntable.

A still further object of the invention is to provide an improved stationary torch type automatic circular fillet-welding apparatus in which a flat-shaped second workpiece may be clamped at any desired position of the turntable, so that a length of a overhanging portion of the long-sized second workpiece can be minimized.

Other objects, features and advantages of the invention will become apparent from the detailed description given hereinafter in connection with the accompanying drawings.

According to the present invention, there is provided a stationary torch type automatic circular fillet-welding apparatus including a stationary welding torch, an inclined turntable to which a substantially flat-shaped second workpiece is clamped, a torch holder and a torch positioner which cooperate with each other to always maintain a working end of the welding torch in such a preset constant position radially spaced apart by a predetermined distance from the center of a tubular or cylindrical first workpiece provisionally fixed to the second workpiece, and a positioner guide mechanism for guiding the torch positioner to any desired position in such a particular plane that extends in parallel relationship with respect to a surface plane of the turntable. The torch positioner is supported by the positioner guide mechanism in such a manner that the former is restricted from rotation on its own axis by the latter.

BRIEF DESCRIPTION OF THE DRAWINGS

In the accompanying drawings:

FIG. 1 is a perspective view of the circular fillet-welding apparatus according to the invention;

FIG. 2 is a top plan view taken in the direction perpendicular to the surface plane of a turntable;

FIG. 3A is an enlarged fragmentary section showing a torch positioner together with a torch holder;

FIG. 3B is a similar view to FIG. 3A, but showing a modification of the torch positioner;

FIG. 5 is a similar view to FIG. 4, but showing another modification of the positioner guide mechanism;

FIG. 4 is a schematic top plan view showing a modification of a positioner guide mechanism;

FIG. 6 is a schematic top plan view, with parts broken away, showing another embodiment of the present invention.

DESCRIPTION OF THE PREFERRED EMBODIMENTS

Figure 7:
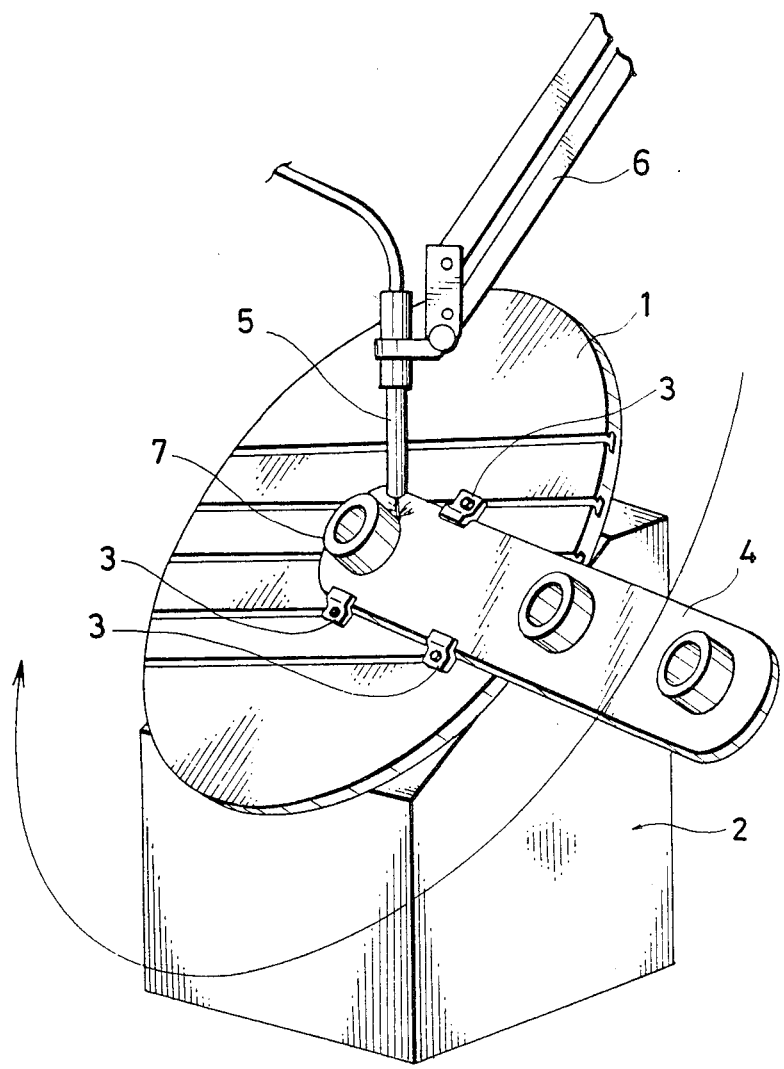
FIG. 7 is a perspective view showing one example of a prior art stationary torch type automatic circular fillet-welding apparatus.

Referring now to the accompanying drawings, in particular to FIGS. 1 to 6, an automatic welding apparatus according to the invention is illustrated as having a turntable 11 inclined at an angle of substantially 45° with respect to a horizontal plane and rotatably supported by a machine frame 12 in which a known drive mechanism is housed, conventionally. The turntable 11 may have a plurality of spaced known T-slots 13 formed in the outer surface wall thereof, conventionally.

A tubular first workpiece B may be provisionally fixed in position to a flat second workpiece W for example by tack-welding. The second workpiece W can be fixed in position by means of a required number of known clamp members 15 with the aid of known T-slot bolts and nuts 14 engaged with the T-slots 13.

It is obvious that the T-slots and the cooperative T-slot bolts and nuts may be dispensed with in case where a known magnetic clamping system, for example a magnetic chuck, is utilized for clamping the workpiece W to the turntable 11.

A welding torch 18 is supported by a torch holder 22 connected to a torch positioner 17 which is in turn carried by a positioner guide mechanism 23.

As best shown in FIG. 3A, the torch positioner 17 includes a supporting shaft 19 which is connected at its upper end to the positioner guide mechanism 23 and extends perpendicularly with respect to a surface plane of the turntable 11, and a conical end member 20 coaxially and freely rotatably mounted to the lower end of the shaft 19 via known bearings 19a. The center of the end member 20 lies on the center line 11 of the shaft 19. Thus, when the conical end member 20 is fully inserted into an internal hollow space of the tubular first workpiece B provisionally fixed in position to the flat second workpiece W clamped to the turntable 11, the center of the shaft 19, that of the member 20 and that of the tubular workpiece B all lie on the center line 11.

Incidentally, it will be easily understood that the end member 20 should not be limited to the conical end member but may be replaced with another modified end member having any other appropriate configuration, for example, a cylindrical configuration (not shown).

In case where the first workpiece B is in the form of a solid cylindrical member as illustrated in FIG. 3B, the end member 20 may be replaced with a modified end member 19a having an internal cavity, preferably a conical cavity as illustrated.

The torch holder 22 may include a guide bar 21 fixedly connected at its one end to the support shaft 19 of the torch positioner 17 and extending in parallel relationship with respect to the surface plane of the turntable 11, a slide piece 22a slidably mounted on the guide bar 21, a support arm 22c fixedly connected at its upper end to the slide piece 22a, and a torch retainer 22e adjustably hinged to a lower end of the support arm 22c by means of a pin 22d. The slide piece 22a can be clamped at an adjusted position on the guide bar 21 by means of a known clamp screw 22b. The welding torch 18 can be fixed in position by means of a clamp screw 22f engaged with the retainer 22e. Thus, the working end of the torch 18 can be adjustably positioned so as to be correctly directed at a constant angle to the junction of the first workpiece B and the second workpiece W. The torch holder 22 may be varied in many ways so far as the torch 18 can be properly positioned. For example, the torch holder 22 may be connected to an appropriate member (e.g. a terminal member 30) of the positioner guide mechanism 23.

The positioner guide mechanism 23 may be realized in various ways. For example as illustrated in FIGS. 1 to 3B, it may include a first parallelogrammic linkage 23a composed of a first pair of opposed elongated arms 27, a connecting member 28, and a base member 26 which is hinged to a support 25 by means of a pin 26a. The support 25 may be rigidly or slidably mounted to a stationary column 24 or the like supporting frame. The positioner guide mechanism 23 further includes a second parallelogrammic linkage 23b composed of the aforesaid connecting member 28, a second pair of opposed elongated arms 29, and a terminal member 30 to which the support shaft 19 of the torch positioner 17 is fixedly mounted. All of the base member 26, the two pairs of opposed elongated arms 27, 29, the connecting member 28, and the terminal member 30 lie in a plane extending in parallel relationship with respect to the outer surface plane of the turntable 11, and thus, under cooperation of the first and the second parallelogrammic linkages 23a and 23b, the terminal member 30 is freely movable in the plane extending in parallel relationship with respect to the outer surface plane of the turntable 11. Because the base member 26 is pivotally connected to the support 25 by means of the pin 26a, the whole parallelogrammic linkages 23a and 23b can be moved up and down. As a result, the torch positioner 17 carried by the terminal member 30 can be freely moved in the plane extending in parallel relationship with respect to the outer surface of the turntable 11 and also can be adjustably moved up and down. Further, because a parallel relationship between the base member 26 and the terminal member 30 is always maintained, the torch positioner 17 and the torch holder 22 fixed to the terminal member 30 are always maintained in position so that the working end of the welding torch 18 can be directed to a preset constant direction.

In the welding operation, the following steps are taken in order:

(a) the tubular first workpiece B is provisionally fixed to a desired position of the flat second workpiece W, for example by tack-welding;

(b) the second workpiece W, having the first workpiece B carried thereon is placed at any suitable position on the outer surface of the turntable 11 and then clamped thereto by means of the clamp members 15;

(c) the conical end member 20 of the torch positioner 17 is inserted, to a possible full extent, into the hollow internal space of the tubular second workpiece B by manually operating the positioner guide mechanism 23, so that the center line 11 of the shaft 19 passes through the center of the tubular second workpiece B;

(d) by manually operating the slide piece 22a and the torch retainer 22e, the welding torch 18 is adjustably positioned and fixed thereto by means of the clamp screws 22b and 22f, so that the working end of the torch 18 is exactly directed, at a preset constant angle, to the junction between the first workpiece B and the second workpiece W; and (e) when the turntable 11 is rotated, a circular weld bead F is formed along the junction of the first and the second workpieces B and W.

In case where a plurality of tubular workpieces B, B1 and B2 are to be welded to the second workpiece W as shown in FIG. 2, the above steps (c) to (e) are simply repeated one after another, without moving the second workpiece W.

In case where the first workpiece B is a cylindrical solid form, the conical end member 20 should be replaced with the end member 20a having a conical internal cavity which can receive an upper part of the cylindrical workpiece B therein, as illustrated in FIG. 3B. In this way, the center 11 of the shaft 19 can be easily coincident with the center of the first workpiece B.

In the above operation, when the turntable 11 is rotated in the direction of an arrow in FIG. 2, the second workpiece B revolves around the center 0 of the turntable 11 and relatively rotates on the axis 11 (FIGS. 3A, 3B). In other words, during one rotation of the turntable 11, the workpiece B makes one revolution around the center 0 of the turntable 11 and one relative rotation on the axis 11. The direction of rotation of the turntable 11 is the same as of revolution and rotation of the first workpiece B. The angular speed of rotation of the turntable 11 is equal to those of revolution and rotation of the first workpiece B.

As the first workpiece B revolves round the center 0 of the turntable, the torch positioner 17 and the torch holder 22 follow therewith. On the other hand, as the first workpiece B relatively rotates on the axis 11, only the end member 20(20a) co-rotates therewith while the support shaft 19 itself does not co-rotate therewith. Accordingly, the torch holder 22 fixed to the support shaft 19 does not co-rotate but maintains its preset constant position with relative to the first workpiece B. Thus, as the first workpiece B makes its full one relative rotation on the axis 21, a complete circular bead F is formed at the circular junction of the first and the second workpieces B, W.

FIG. 4 illustrates a modification of the positioner guide mechanism 23, which includes four pulleys 31, 35, 38, 39, two swing arms 32 and 33 and two endless belts 36 and 40. The first pulley 31 is stationary and does not rotate. The first swing arm 32 is connected at its one end to the first pulley 31 so as to move about a coaxial pivot pin 31a of the first pulley 31.

The second and the third pulleys 35 and 38 are coaxially mounted to the free end of the first swing arm 32 by means of a pivot pin 34 so that the pulleys 35 and 38 are free to rotate about the pin 34. The second swing arm 33 is connected at its one end to the pivot pin 34 so as to pivot about it. The fourth pulley 39 is mounted to the free end of the second swing arm 33 by means of a coaxial pivot pin 37.

The first endless belt 36 is engaged with the first and the second pulleys 31 and 35, while the second endless belt 49 is engaged with the third and the fourth pulleys 38 and 39.

In this connection, it is to be noted that a diameter of the first pulley 31 should be equal to that of the second pulley 35, and that a diameter of the third pulley 38 should be equal to that of the fourth pulley 39, in order to prevent each of the pulleys 35, 38 and 39 from rotating on its own axis.

In operation, when the first swing arm 32 is moved about the pivot pin 31a, both of the second and the third pulleys 35 and 38 revolve around the pivot pin 31a but do not rotate on their respective own axis. When the second swing arm 33 is moved about the pivot pin 34, the fourth pulley 39 revolves around the pivot pin 34 but does not rotate on its own axis. Thus, regardless of the movement of the swing arms 32 and 33, the fourth pulley 39 does not rotate on its own axis. As a result, the torch positioner 17 fixed to the fourth pulley 39 is always maintained in a predetermined relative position, so that the welding torch 18 is maintained in a preset constant position relative to the junction of the first and the second workpieces B and W.

FIG. 5 illustrates another modification of the positioner guide mechanism 23, which includes a combination of a pair of parallel guide rails 41 extending in the directions of Y-axis and a cross rail 42 extending in the direction of X-axis. The cross rail 42 is freely movable back and forth in the Y-axis directions along the guide rails 41 by means of known rollers 42. Both of the guide rails 41 and the cross rails 42 extend in parallel relationship with respect to the outer surface plane of the turntable 11.

The torch positioner 17 is slidably supported by the cross rail 42 by means of known rollers 42, so that it is freely guided back and forth in the X-axis directions along the cross rail 42. Thus, the torch positioner 17 can be adjustably moved in all directions along the Y- and the X-axes, taking its desired position on the plane extending in parallel relationship with respect to the surface plane of the turntable 11. As a result, the welding torch 18 is maintained in a preset constant position with relative to the junction of the first and the second workpieces B, W.

FIG. 6 illustrates a further modification of the positioner guide mechanism 23, wherein the mechanism 23 of FIG. 5 is combined with a known numerical control system. In the embodiment of FIG. 6, the pair of guide rails 41 lie under the machine frame 52, while the cross rail 42 is a gantry type lying over the machine frame 52. The cross rail 42 is supported by a pair of end columns 53 which are guided together in the direction of Y-axis by means of the the rollers 42a.

A first drive motor 47 is provided at one extremity of one of the pair of guide rails 41. A drive pulley 43 is operatively connected via a known drive shaft to the first drive motor 47. A driven pulley 44 is mounted to the opposite extremity of the aforesaid guide rail 41. A first control wire 45 is engaged with both of the pulleys 43 and 44, with its one end 45a connected to one side of a roller supporting frame which supports the rollers 42a, and also with its other end 45b connected to the other side of the roller supporting frame, so that the control wire 45 extends in a substantially endless manner. Thus, when the drive pulley 43 is driven, the driven pulley 44 is rotated by means of the first control wire 45 and at the same time the cross rail 42 is moved in the direction of the Y-axis.

On the other hand, a second drive motor 51 is provided at one extremity of the cross rail 42. A drive pulley 48 is operatively connected via a known drive shaft to the second drive motor 51. A driven pulley 49 is mounted to the opposite extremity of the cross rail 42. A second control wire 50 is engaged with both of the pulleys 48, 49, with its one end 50a connected to one side of a roller supporting frame which supports the rollers 42b, and also with its other end 50b connected to the other side of the roller supporting frame, so that the control wire 50 extends in a substantially endless manner. Thus, when the drive pulley 48 is driven, the driven pulley 49 is rotated by means of the second control wire 50, and at the same time, the torch positioner 17, which is carried by a roller supporting frame which supports the rollers 42b, is moved in the directions of the X-axis. Thus, the torch positioner 17 can be guided in every direction to a desired position on a plane extending in parallel relationship with respect to the outer surface plane of the turntable 11, by means of the drive motors 43 and 51 which are driven by data inputted to the control unit 46. It is also possible to control the turntable 11 by means of a known drive 12' which is driven by data inputted to the control unit 46. It is also possible to control the movement of the end member 20(20a) of the torch positioner 17 by data inputted to the control unit 46, so that the desired welding performance can be continuously carried out one after another with respect to a plurality of first workpieces B provisionally fixed on the second workpiece W. As such an automatic control system, a numerical control system may preferably be utilized.

In operation, the turntable 11 is driven to take a desired inclined position. Then, the first and the second drive motors 47 and 51 are driven by the inputted data so that the torch positioner 17 is guided over to a selected first workpiece B and the end number 20(20a) is lowered into engagement with the selected workpiece B. After that, the motors 47 and 51 are released from the control, so that the torch positioner 17 can be free to move in every direction along the Y- and X-axes. Then, the turntable 11 is driven into rotation and simultaneously therewith the welding torch 18 is put into operation. Thus, during one rotation of the turntable 11, a complete circular bead F (FIGS. 3A, 3B) is formed at the junction between the first and the second workpieces B, W. For performance of subsequent weldings, the same operation is repeated.

It is also possible, if desired, to provide a movable guide bar 21 which can be automatically controlled in up-and-down movement by means of the control unit 46. It is also possible to provide a movable torch holder 22 which can be automatically controlled in position by means of the same control unit 46.

The present invention being thus described, it will be obvious that same may be varied in many ways. Such variations are not to be regarded as a departure from the spirit and scope of the invention, and all such modifications as would be obvious to those skilled in the art are intended to be included within the scope of the present invention.

We claim:

1. An automatic welding apparatus for forming a circular bead along a circumference of a first workpiece at its junction with a second workpiece in order to weld the first workpiece to the second workpiece, comprising
   a turntable, having a center and an outer surface, supported by a machine frame so as to rotate on its own axis,
   said second workpiece having a center which is not coincident with the center of said turntable,
   a clamp means for clamping said second workpiece to said outer surface of said turntable for co-rotation therewith,
   a torch holder for adjustably holding a welding torch,
   a torch positioner having a freely rotatable end member which is engageable with said first workpiece provisionally fixed to said second workpiece so as to revolve around said center of said turntable when the latter rotates on its own axis, said torch holder being supported by said torch positioner, with said welding torch maintained in a preset orientation, and
   a positioner guide mechanism for supporting said torch positioner so as to permit free movement of said torch positioner in a plane extending in parallel relationship with respect to a surface plane of said turntable to keep engagement of said end member with said first workpiece before and during rotation of said turntable.

2. The welding apparatus as defined in claim 1, wherein said torch positioner, which supports said torch holder, includes a support shaft carried by said positioner guide mechanism and said end member is mounted to a free end of said support shaft for engagement with said first workpiece.

3. The welding apparatus as defined in claim 2, wherein
said torch holder includes a guide bar connected at its one end to said support shaft and extending in parallel relationship with respect to said surface plane of said turntable, a slide piece slidably mounted on said guide bar, a support arm connected to said slide piece, and a torch retainer mounted to said support arm.

4. The welding apparatus as defined in claim 2, wherein
said end member has a conical external surface for automatically centering said end member with respect to said first workpiece.

5. The welding apparatus as defined in claim 2, wherein
said end member has a cavity formed in its lower end wall, and
said cavity has an internal conical surface for automatically centering said end member with respect to said first workpiece.

6. The welding apparatus as defined in claim 1, wherein
said positioner guide mechanism includes a first parallelogrammic linkage composed of a first pair of opposed elongated arms, a connecting member, and a base member hinged to an external support means, and a second parallelogrammic linkage composed of said connecting member, a second pair of opposed elongated arms, and a terminal member to which said torch positioner is connected.

7. The welding apparatus as defined in claim 1, wherein
said positioner guide mechanism includes a stationary first pulley supported by an external supporting means, a first swing arm pivoted at its one end to said first pulley, a second and a third pulleys coaxially mounted to a free end of said first swing arm, a second swing arm pivoted at its one end to said free end of said first swing arm, and a fourth pulley mounted to a free end of said second swing arm, a first endless belt engaged with said first and said second pulleys, and a second endless belt engaged with said third and said fourth pulleys, and
said torch positioner is connected to said fourth pulley.

8. The welding apparatus as defined in claim 1, wherein
said positioner guide mechanism includes a pair of parallel guide rails, and a cross rail free to move back and forth along said pair of guide rails, and
said torch positioner is carried by said cross rail so as to be freely move back and forth along said cross rail.

9. The welding apparatus as defined in claim 8, wherein
said cross rail is driven by a first drive motor to move back and forth along said pair of guide rails, and
said torch positioner is driven by a second drive motor to move back and forth along said cross rail.

10. The welding apparatus as defined in claim 9, wherein
said first and said second drive motors are controlled by a numerical control system.

* * * * *